United States Patent
Edwards et al.

(10) Patent No.: US 8,508,089 B2
(45) Date of Patent: Aug. 13, 2013

(54) MAGNETIC DRIVE MOTOR ASSEMBLY AND ASSOCIATED METHODS

(75) Inventors: John W. Edwards, Arcadia, FL (US); Robert M. Herrin, Orlando, FL (US); Johnny M. Tharpe, Jr., Albany, GA (US)

(73) Assignee: Magnamotor, LLC, Arcadia, FL (US)

( * ) Notice: Subject to any disclaimer, the term of this patent is extended or adjusted under 35 U.S.C. 154(b) by 309 days.

(21) Appl. No.: 13/081,595

(22) Filed: Apr. 7, 2011

(65) Prior Publication Data
US 2012/0049674 A1 Mar. 1, 2012

Related U.S. Application Data

(60) Provisional application No. 61/378,984, filed on Sep. 1, 2010, provisional application No. 61/416,405, filed on Nov. 23, 2010.

(51) Int. Cl.
*H02K 7/06* (2006.01)

(52) U.S. Cl.
USPC .......................................................... 310/80

(58) Field of Classification Search
USPC ............................................ 310/37, 80, 152
See application file for complete search history.

(56) References Cited

U.S. PATENT DOCUMENTS

| | | |
|---|---|---|
| 2,790,095 A | 4/1957 | Peek et al. |
| 3,675,506 A | 7/1972 | Leone |
| 3,703,653 A | 11/1972 | Tracy et al. |
| 3,899,703 A | 8/1975 | Kinnison |
| 3,967,146 A | 6/1976 | Howard |
| 4,011,477 A | 3/1977 | Scholin |
| 4,038,572 A | 7/1977 | Hanagan |
| 4,207,773 A | 6/1980 | Stahovic |
| 4,387,793 A | 6/1983 | Sugano |
| 4,924,123 A | 5/1990 | Hamajima et al. |
| 5,055,727 A | 10/1991 | Kenderdine |
| 5,105,113 A | 4/1992 | Ishikura et al. |
| 5,219,034 A | 6/1993 | Wortham |
| 5,415,140 A | 5/1995 | Rigazzi |
| 6,274,959 B1 | 8/2001 | Uchiyama |
| 6,700,248 B2 | 3/2004 | Long |
| 2002/0167236 A1* | 11/2002 | Long ............................... 310/80 |
| 2004/0140722 A1* | 7/2004 | Long ............................... 310/80 |
| 2007/0210659 A1* | 9/2007 | Long ............................... 310/80 |

(Continued)

FOREIGN PATENT DOCUMENTS

| | | |
|---|---|---|
| JP | 7274481 | 10/1995 |
| JP | 2001-346375 | 12/2001 |

(Continued)

OTHER PUBLICATIONS

International Searching Authority, PCT Notification of Transmittal of International Search Report and Written Opinion mailed Mar. 27, 2012; entire document.

*Primary Examiner* — Nguyen N Hanh
(74) *Attorney, Agent, or Firm* — Allen, Dyer, Doppelt, Milbrath & Gilchrist, P.A.

(57) ABSTRACT

A permanent magnet is rotated about an axis extending between opposing north and south poles. The magnetic field of the rotated permanent magnet interacts with magnetic fields of permanent magnets carried by a shuttle for repelling and attracting the fixed permanent magnets, and providing a linear reciprocating movement of the shuttle responsive to the rotary motion of the rotated permanent magnet.

26 Claims, 10 Drawing Sheets

(56) References Cited

U.S. PATENT DOCUMENTS

2007/0278800 A1    12/2007   Galich
2008/0277939 A1    11/2008   Richardson et al.
2008/0303365 A1*   12/2008   Tkadlec .......................... 310/80

FOREIGN PATENT DOCUMENTS

| | | |
|---|---|---|
| JP | 2002-027734 | 1/2002 |
| WO | 00/14410 | 3/2000 |
| WO | 01/77522 | 10/2001 |

* cited by examiner

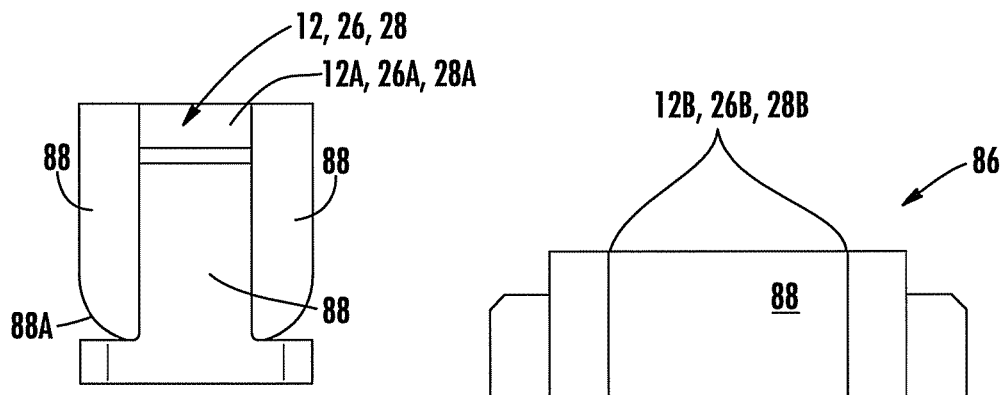
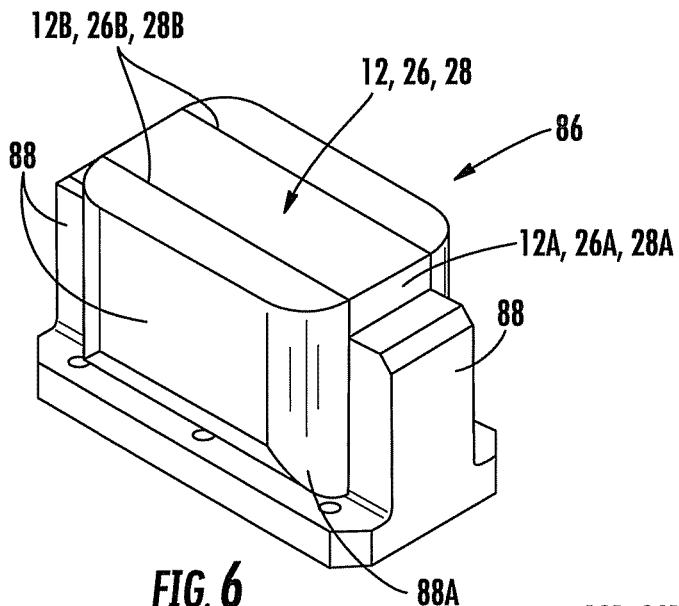
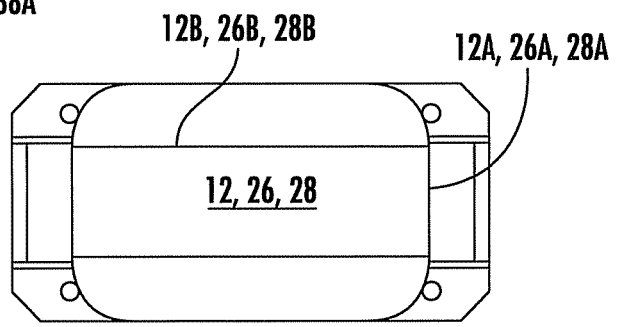

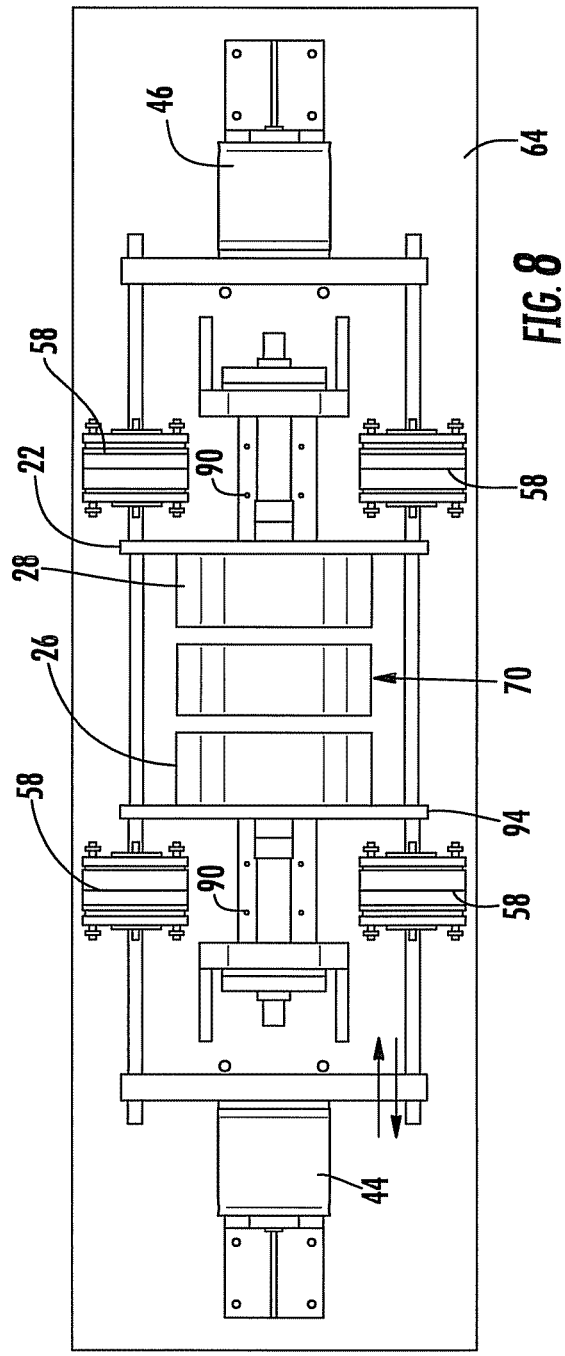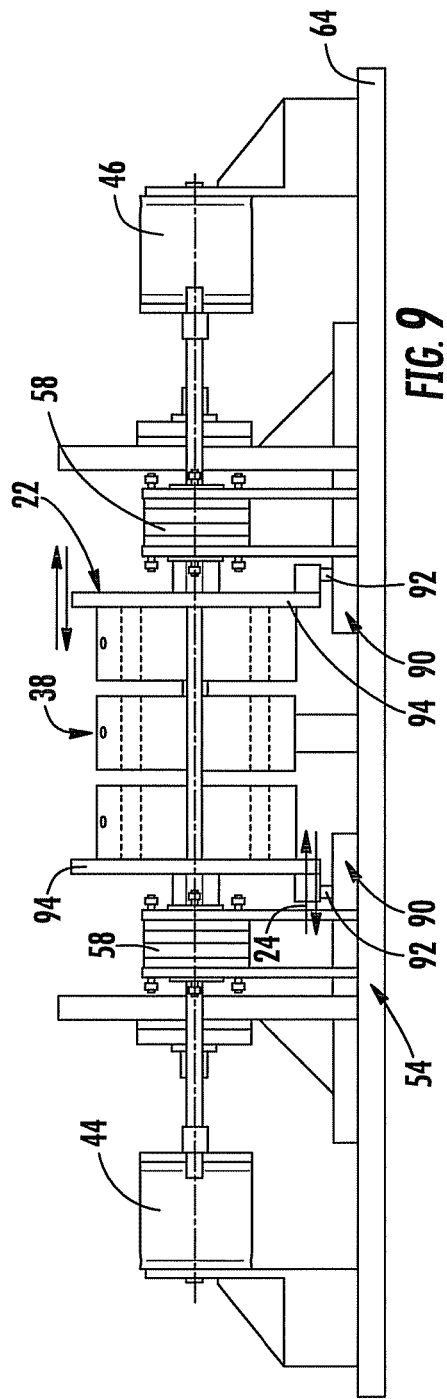

MAGNETIC DRIVE MOTOR ASSEMBLY AND ASSOCIATED METHODS

CROSS-REFERENCE TO RELATED APPLICATIONS

This claims the benefit of U.S. Provisional Application Nos. 61/378,984 filed Sep. 1, 2010 for Magnetic Drive Motor Assembly and Method, and 61/416,405 filed Nov. 23, 2010 for Magnetic Drive Motor Assembly and Associated Methods, the disclosures of which are hereby incorporated by reference herein in their entireties, and all commonly owned.

FIELD OF THE INVENTION

The present invention generally relates to devices and methods employing a magnetic field for providing a driving force, and more particularly to a motor drive using permanent magnets for enhancing power from a motor.

BACKGROUND OF THE INVENTION

The use of a magnetic field to provide a driving force is well known. Reducing available sources of standard types of fuel and concerns for protecting the environment have led to increased efforts in developing alternative sources for supplying energy to drive power systems. One type of power system which eliminates the need for fuel and also eliminates the ecological drawbacks of fuel consumption is a system which utilizes magnetic motors. As described in U.S. Pat. No. 4,038,572 to Hanagan, it is desirable to have a prime mover which would not depend exclusively upon fossil fuels. The benefits of alternate forms of prime movers adapted to be utilized in motor vehicles, and the like, is well known in the art. The desirability of developing a prime mover for motor vehicles which would not be dependent on fossil fuels for its source of energy has received a great deal of impetus. In response, Hanagan provides a magnetic clutch device described as a magnetically driven motor.

U.S. Pat. No. 3,899,703 to Kinnison for a Permanent Magnet Motion Conversion Means discloses a magnetic motor using stationary magnets arranged with inverse polarity and another permanent magnet alternately movable within the field of the stationary magnets by a diverter, such as a solenoid, to convert a rotational movement to a linear movement.

Indeed, several types of magnetic motors are known in which a rotating set of magnets is influenced by attractive and repulsive forces created by opposing magnets. U.S. Pat. No. 4,207,773 to Stahovic discloses arcuate shaped permanent magnets affixed to a moveable member on opposing sides of a rotatable magnet such that rotation of the rotatable magnet causes an alternating linear movement of the moveable member. U.S. Pat. No. 4,011,477 to Scholin discloses an apparatus for converting variation I magnetic force between magnets, one rotating and one non-rotating, into a reciprocating linear motion, the disclosure of which is incorporated by reference. U.S. Pat. No. 3,703,653 to Tracy et al discloses a set of magnets mounted for rotation about an axis first attracted towards the corresponding stationary magnets. After the rotatable magnets are aligned with the stationary magnets, the magnetic fields of the stationary magnets are then altered so as to provide a repulsion force with respect to the rotatable magnets thereby causing the continued rotation of the rotatable magnets. In order to accomplish this effective inversion of the polarity of the stationary magnets, so as to alternately provide the attractive and repulsive forces, the stationary magnets are initially covered by magnetic plates as the rotatable magnets are approaching the position of the stationary magnets. These magnetic plates in effect cause the stationary magnets to provide attractive forces to the rotatable magnets. When the rotatable magnets are then in alignment with the stationary magnets, these magnetic plates are removed and the stationary magnets then provide a repulsion force to the rotatable magnets and thereby cause the continued movement of the rotatable magnets.

Yet further, linear generators are well known and used to generate electric energy by reciprocal movement of magnets with inductive coils. Typically, the linear generator has a plurality of inductive coils, a plurality of magnets inserted into the respective inductive coils and slidable between two opposing ends of the inductive coils, a mechanical assembly connected to ends of the magnets, and a motor generating and applying a movable force to the magnets through the mechanical assembly. Various linear generators are described in U.S. Pat. No. 4,924,123 and US Patent Application Publication 2008/0277939, the disclosures of which are herein incorporated by reference.

Attempts continue to provide magnetic motors which can be economically and efficiently operated for providing power. With such extensive use of magnetic fields to do work, there remains a need to provide an efficient means for enhancing operation of well-known machines using available magnetic forces for improving efficiency of power sources and enhancing power output from devices such as motors.

SUMMARY OF THE INVENTION

The invention employs a rotatable permanent magnet having a north pole and an opposing south pole rotatable about an axis and between the opposing poles. A shuttled confined to a linear movement generally parallel to the axis may include first and second fixed permanent magnets affixed to the shuttle, wherein the rotatable permanent is carried therebetween. Each of the first and second fixed permanent magnets has a north pole and an opposing south pole with the axis extending therebetween. The permanent magnets are positioned such that rotation of the rotatable permanent magnet results in repelling and attracting of the first and second fixed permanent magnets, alternately, and thus a linear reciprocating movement of the shuttle.

BRIEF DESCRIPTION OF THE DRAWINGS

For a fuller understanding of the invention, reference is made to the following detailed description, taken in connection with the accompanying drawings illustrating various embodiments of the present invention, in which:

FIG. 6 is a front right perspective view of a permanent magnet carried within a shoe for a focusing of a magnetic field;

FIGS. 6A, 6B and 6C are front, side and top views of the embodiment of FIG. 6; and FIGS. 7, 8 and 9 are perspective, top and side views, respectively, of another embodiment of the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
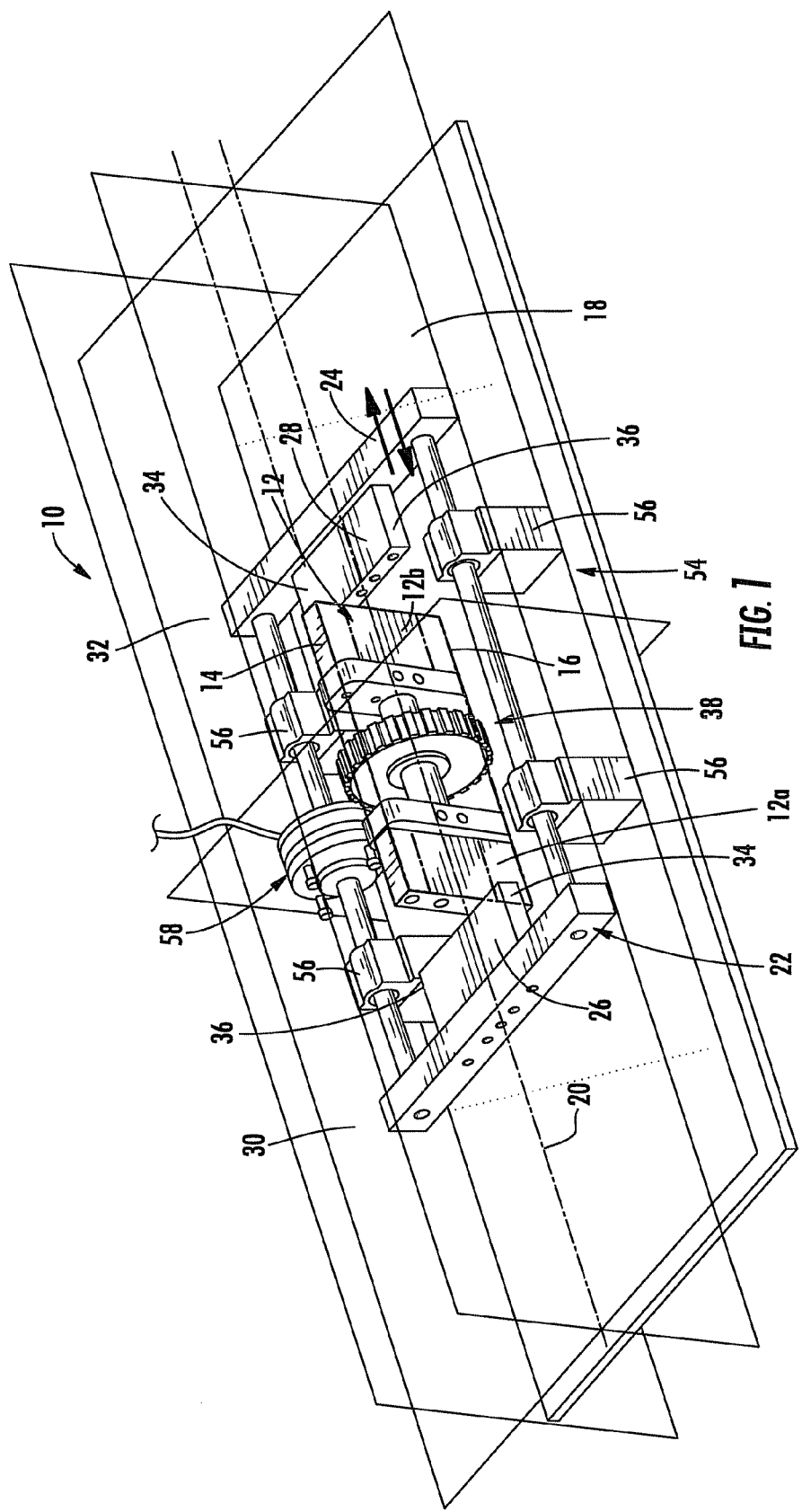
FIG. 1 is a partial perspective view of one embodiment of the invention.

Referring initially to FIG. 1, one embodiment in keeping with the teachings of the present invention directed to motion conversion is herein described, by way of example, as an apparatus 10 comprising a rotatable permanent magnet 12 having a north pole 14 and an opposing south pole 16 aligned within a plane 18. The rotatable permanent magnet 12 is rotatable about an axis 20 within the plane 18 and lying between the opposing poles 14, 16. A shuttle 22 is confined to a linear reciprocating movement 24 generally parallel to the axis 20. The rotatable permanent magnet 12 is positioned between first and second fixed permanent magnets 26, 28 affixed to opposing first and second sides 30, 32 of the shuttle 22. Each of the first and second fixed permanent magnets 26, 28 has a north pole 34 and an opposing south pole 36, wherein the axis 20 extends therebetween. The magnets are positioned such that rotation of the rotatable permanent magnet 12 is coincident with a repelling and an attracting of the first and second fixed permanent magnets 26, 28, alternately, and the linear reciprocating movement 24 of the shuttle 22.

Figure 2:
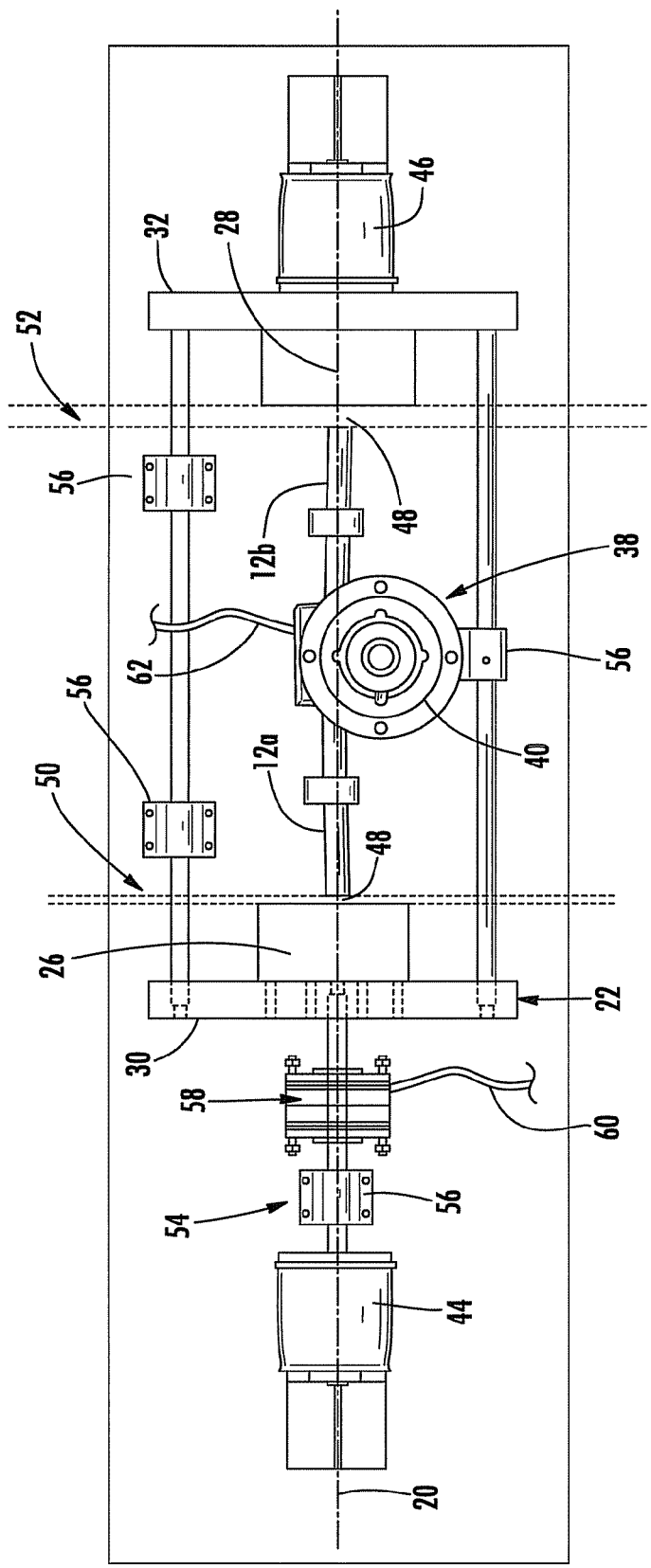
FIG. 2 is a partial top plan view of the embodiment of FIG. 1 illustrating additional features thereof.

While those of skill in the art will appreciate that converting a direction of motion may include converting a linear motion to a rotary motion and converting a rotary motion to a linear motion, by way of example, embodiments of the invention as herein described are directed to improving efficiencies when converting a rotary motion to a linear motion. More specifically, the rotatable permanent magnet illustrated and described with reference again to FIG. 1 and now to FIG. 2 is operable with a motor drive 38 for rotation thereof in affecting linear movement of the fixed permanent magnets 26, 28 and a reciprocating linear movement 24 of the shuttle 22. For the embodiment herein described, the motor drive 38 includes an electric motor, but is will be understood that other well known drives may be employed without departing from the teachings of the invention.

With continued reference to FIGS. 1 and 2, while a single rotatable permanent magnet 12 may be employed, desirable improvements include at least two opposing rotatable permanent magnets 12a, 12b. A shaft 42 is rotated about the axis 20 by the motor drive 38.

With reference again to FIG. 2, the apparatus 10 further comprises first and second shock absorbers 44, 46 affixed on opposing sides 30, 32 of the shuttle 22. Each shock absorber 44, 46 receives an impact of the shuttle 22 during the reciprocating movement, and each shock absorber absorbs an impact by overcoming an inertia provided by the shuttle and delivers a recoiling force to the shuttle.

With continued reference to FIGS. 1 and 2, opposing faces 12f, 26f, 28f of the rotatable 12a, 12b and fixed permanent magnets 26, 28 are in a spaced relation during the reciprocating movement 24 of the shuttle 22, wherein a gaps 48 formed thereby have dimensions ranging from 0.045 inches at a first extreme position 50 of the shuttle 22 to 1.17 inches at a second opposing extreme 52 position during the reciprocating movement. Further, improved efficiency results when the poles 34, 36 of the first fixed permanent magnet 26 are 180 degrees out of phase with the poles 34, 36 of the second permanent magnet 28, as illustrated with reference again to FIG. 1.

With continued reference to FIGS. 1 and 2, a guide 54 slidably receives the shuttle 22 for maintaining an alignment of the linear movement 24 parallel to the axis 20. The guide 54, herein presented with reference to FIGS. 1 and 2, includes multiple bearings 56. A linear generator 58 is operable with the shuttle 22 for generating electrical power resulting from the linear movement 24 of the shuttle. When using the electric motor 40, it is appropriate to measure the electrical output 60 from the linear generator 58 and compare it to the electrical input 62 to the electric motor as measure of efficiency for the apparatus 10.

Efficiencies have been shown to increase when employing multiple permanent magnet pairs. One embodiment herein illustrated by way of example is illustrated with reference to FIGS. 3-5 for an apparatus 10A for converting rotary motion provided by the motor drive 38 to the reciprocating linear motion of the shuttle 22. The apparatus 10A is herein described as including a base 64 and the electric motor 40 affixed to the base. The motor 40 is affixed to the base 64 and rotates a drive shaft 66 about its axis coincident with the axis 20. A plurality of auxiliary shafts 68 is rotatably carried by a bracket 70 affixed to the base 64. As herein described by way of example, four auxiliary shafts 68 are employed. Each of the auxiliary shafts has its ends 72, 74 extending through first and second sides 76, 78 of the bracket 70. A gear assembly 80 is operable between the drive shaft 66 and the auxiliary shafts 68 for rotation by the drive shaft. A plurality of rotatable permanent magnets 12 is attached to the plurality of auxiliary shafts 68. Each of the rotatable permanent magnets 12 is carried at each of the ends 72, 74 of the auxiliary shafts 68 for rotation by their respective auxiliary shafts. The bearings 56 are attached to the base 64 and the shuttle 22 is slidably guided by the bearings for the linear movement 24 generally parallel to the axis 20. A plurality of fixed permanent magnets 26, 28 is affixed to the shuttle 22, wherein a fixed permanent magnet is positioned on the shuttle for interacting with a cooperating rotatable permanent magnet carried at the end of the auxiliary shaft. By way of example, and with continued reference to FIG. 5, the magnetic field of the fixed magnet 26A interacting with the magnetic field of rotatable magnet 12A, field of the magnet 26B with field of the magnet 12B, field of the magnet 28A with field of the magnet 12C, field of the magnet 28B with field of the magnet 12D, and the like for the balance of the magnets used in the apparatus 10A.

As was described for the apparatus 10 in FIGS. 1 and 2, rotation of the rotatable permanent magnets 12 by the motor 40 results in a repelling and an attracting of the fixed permanents 26, 28 affixed to the shuttle 22, thus provides the linear reciprocating movement 24 to the shuttle.

For the apparatus 10A, the shock absorbers 44, 46 are affixed to the base 64 on opposing sides of the bracket 70 with each of the shock absorbers operable for receiving an impact of the shuttle during the reciprocating movement 24 and limiting the movement. The linear generator 58 has its moveable shaft 82 attached to an extension 84 of the shuttle 22, herein attached using a bracket 84 as illustrated with reference again to FIGS. 4 and 5, and now to the enlarged partial perspective view of FIG. 4A.

Figure 3:
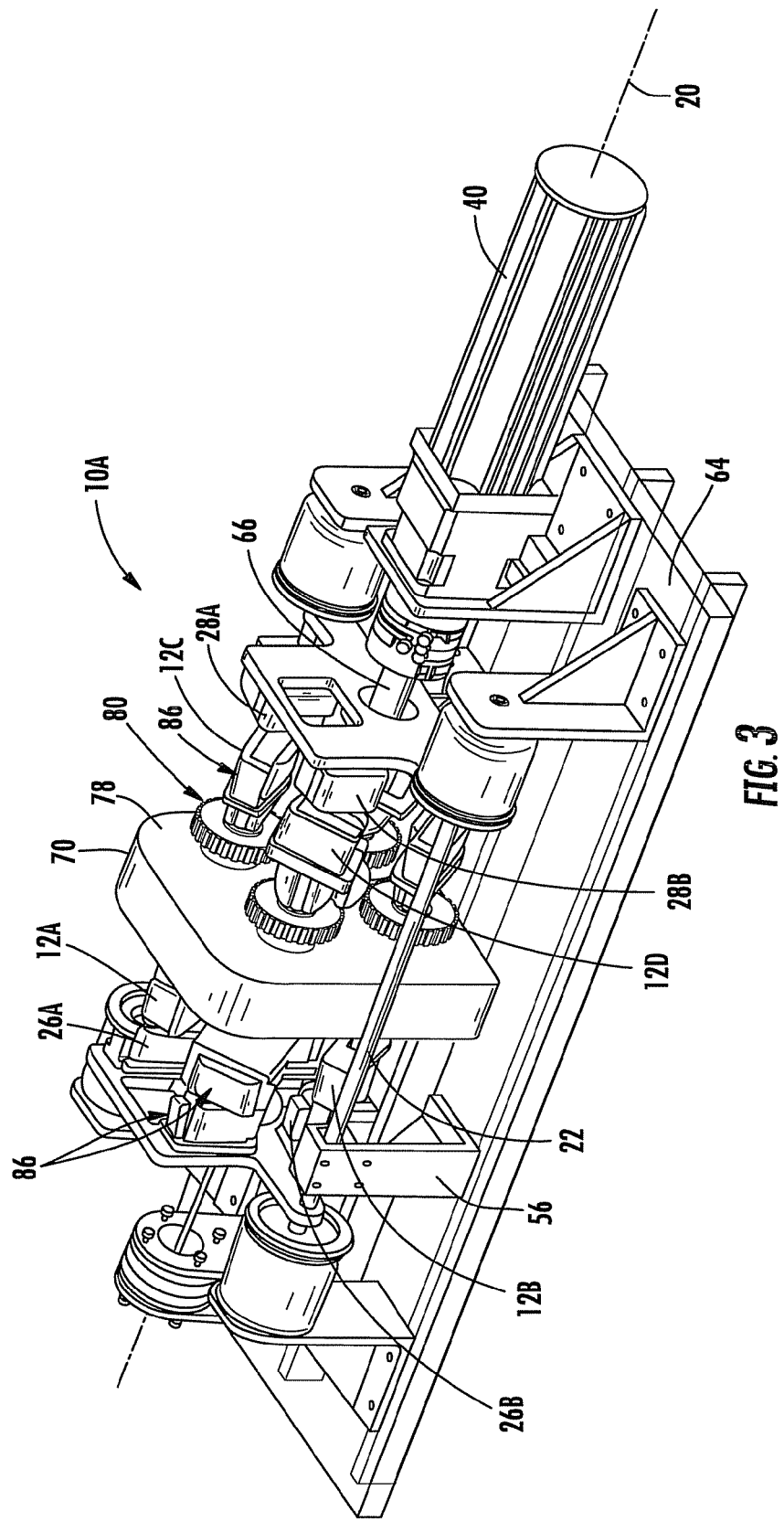
FIG. 3 is a front left perspective view of an alternate embodiment of the invention.
Figure 3A:
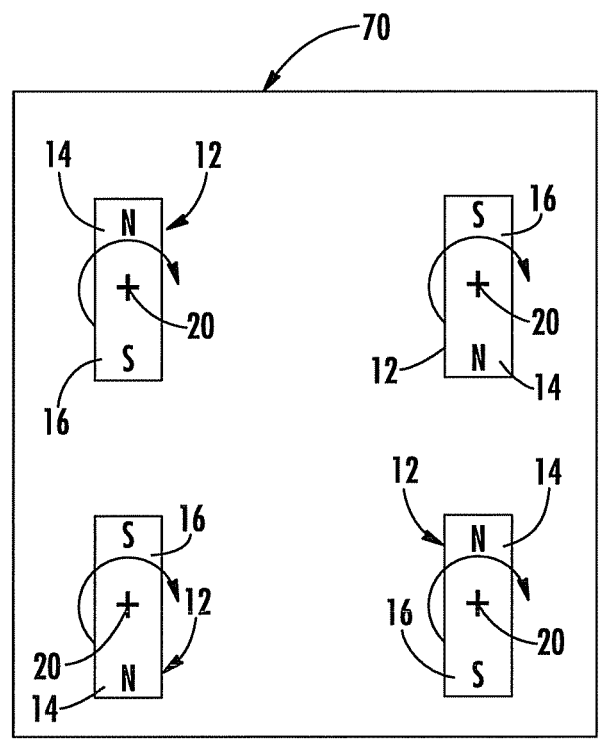
FIG. 3A is a partial front view of a portion of the embodiment of FIG. 3 illustrating a desirable alignment and rotation of rotatable permanent magnets.
Figure 5A:
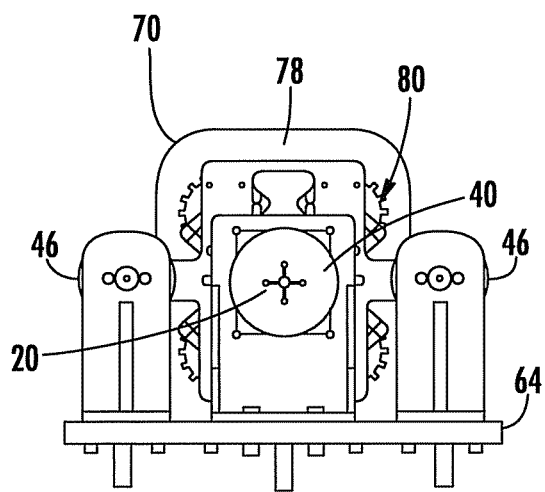
FIG. 5A is an end view of the embodiment of FIG. 3.

As described for the embodiment of FIG. 1, it is desirable to have each of the rotatable permanent magnets rotated by the auxiliary shafts 68 extend between the opposing north and south poles, and the plurality of rotatable permanent magnets on each side of the bracket have their respective poles opposing each other north to north and south to south, as illustrated with reference to FIG. 3A. Also, the shuttle and magnets are such that the gap 48 ranges from 0.045 inches at a first extreme position of the shuttle to 1.17 inches at a second opposing extreme position during the reciprocating movement 24, by way of example for one operation. Further, the fixed permanent magnets 26, 28 are preferably 180 degrees out of alignment with each other with respect to their polarity.

Figure 4:
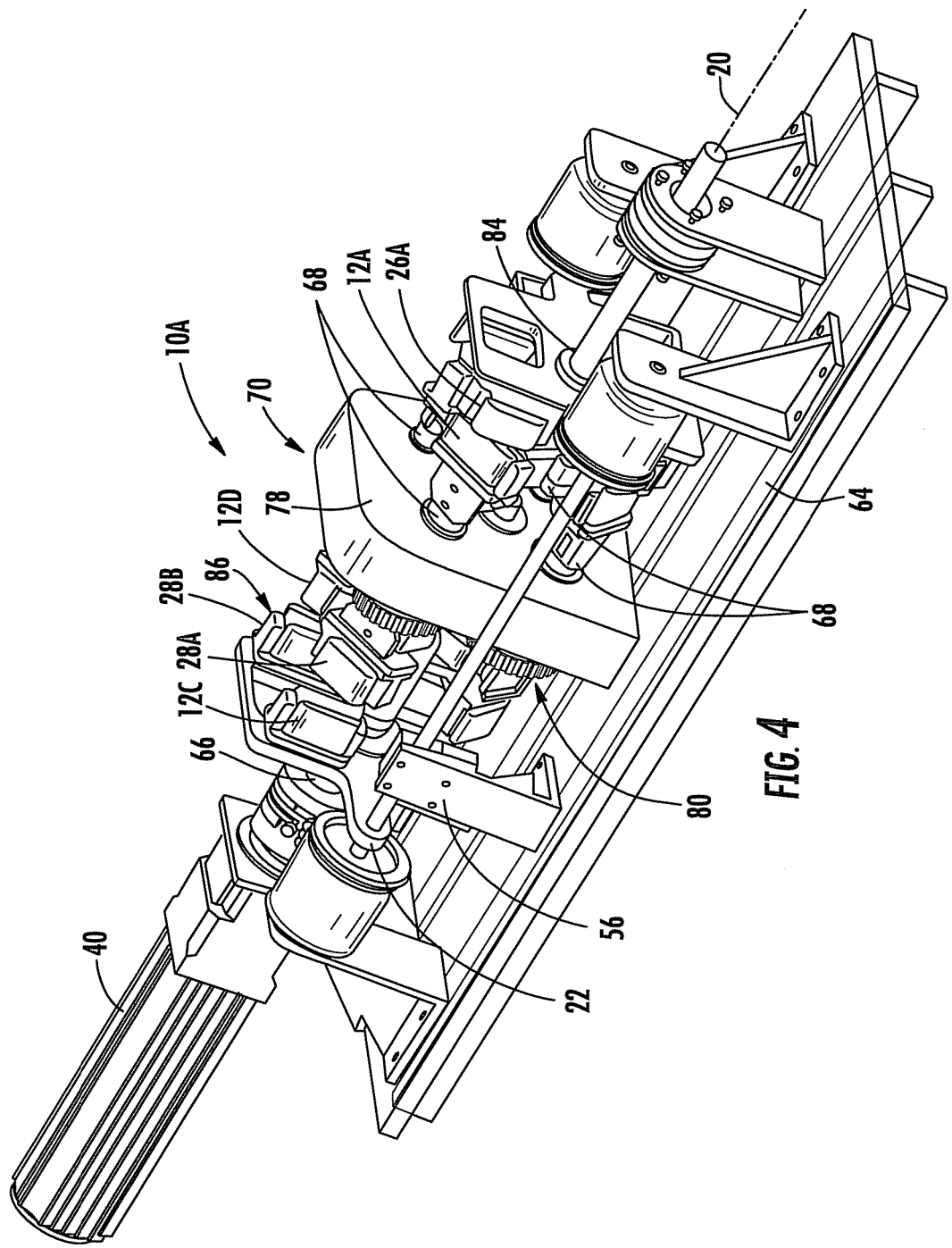
FIG. 4 is a rear left perspective views of the embodiment of FIG. 3.
Figure 4A:
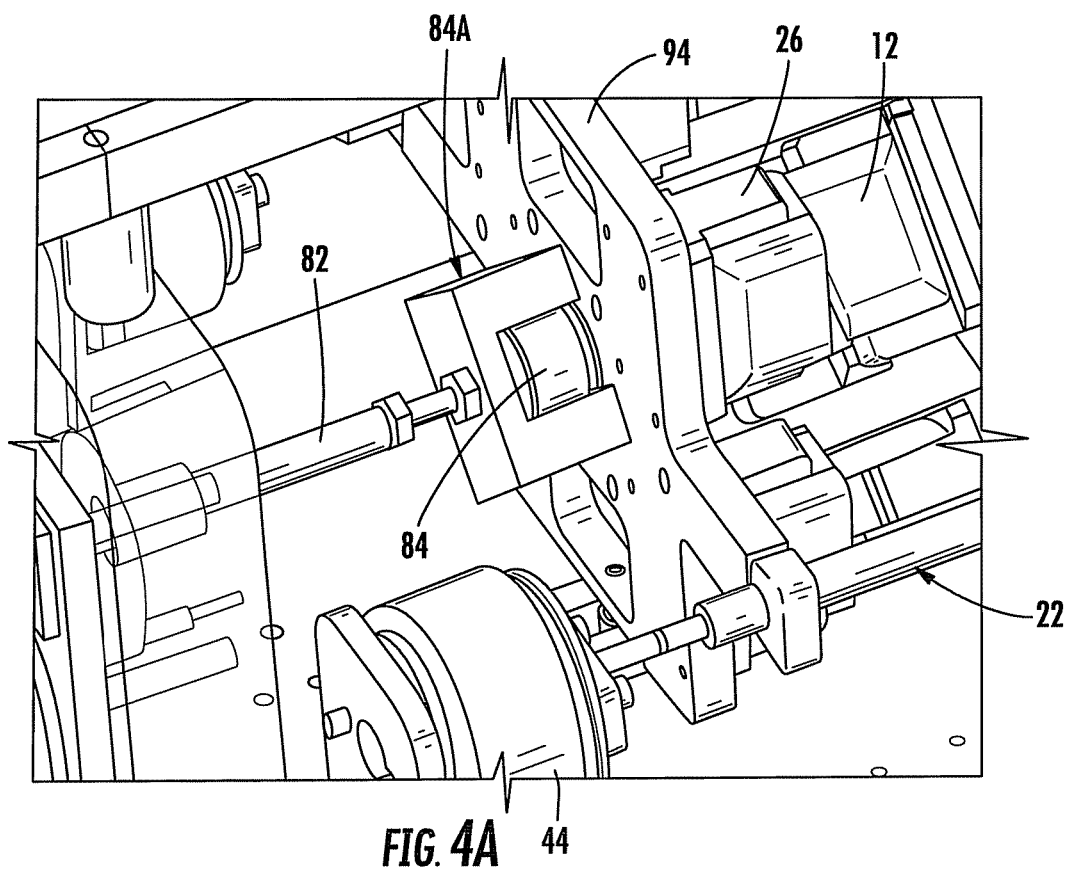
FIG. 4A is a partial enlarged perspective view illustrating a portion of the apparatus of FIG. 4 proximate a linear generator.
Figure 5:
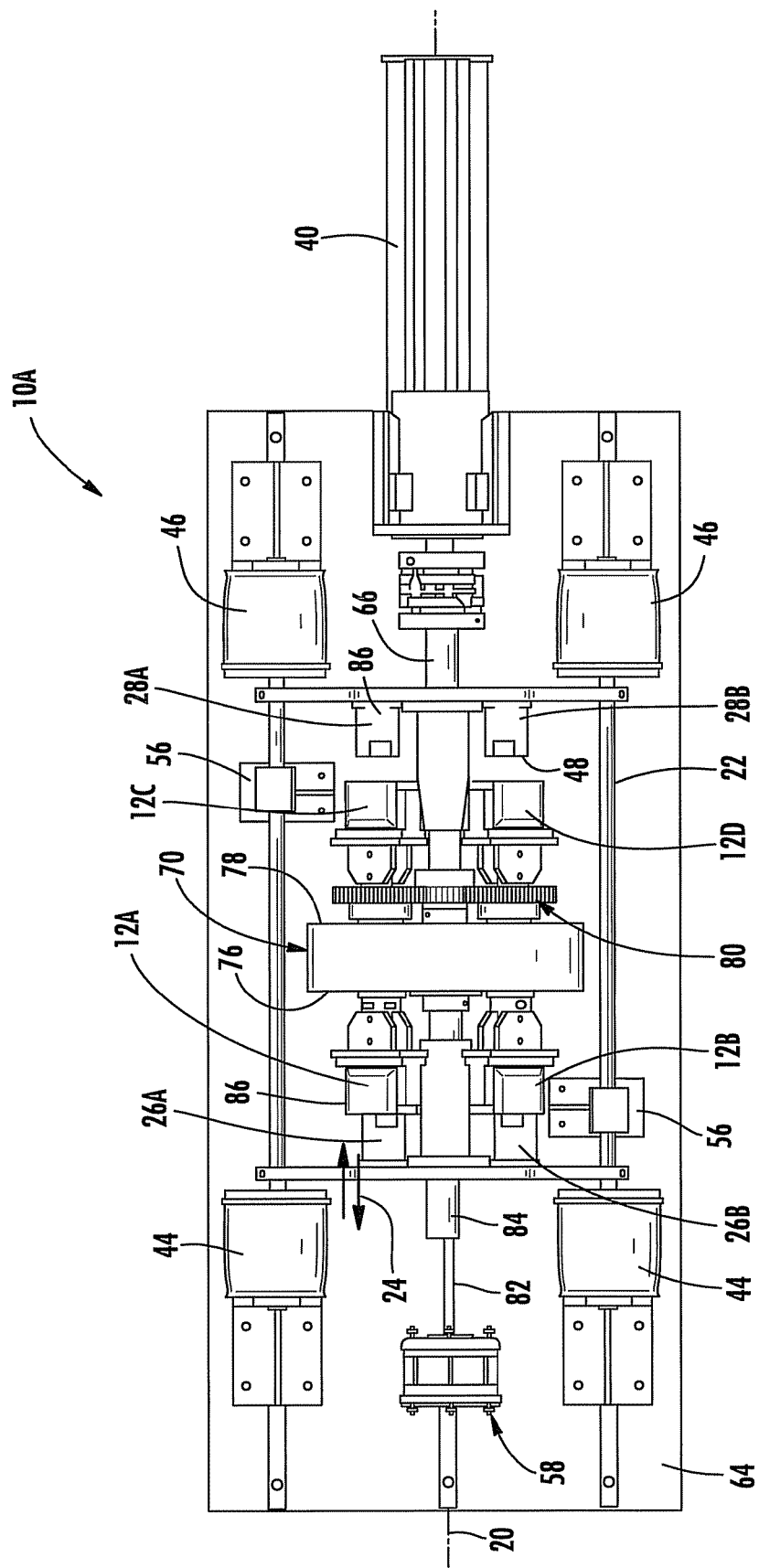
FIG. 5 is a top plan view of the embodiment of FIG. 3.

Improved out efficiencies are realized for embodiments operating with one pair of opposing magnets (by way of example, one quadrant of FIG. 3A, and as described with reference to FIG. 1, by way of example), to operating with two quadrants (an opposing set of magnet pairs as illustrated with reference again to FIG. 3A), wherein a measurable gain in efficiency is realized, to operating with all four quadrants (as illustrated with reference to FIG. 3A and as herein described for the embodiments of FIGS. 3-5, by way of example of currently preferred embodiments. A synergy results from the arrangement of magnet pairs so described. Further improvements have been realized by use of the shock absorbers 44, 46 having a three to one change in compression. By way of further example, one operation of the apparatus 10A has shown desirable results while running with a shuttle oscillation, the linear reciprocating movement 24, of about 500 RPM and a shuttle throw of gap 48 ranging from one and one eight inches to 30/1000 inches. Other characteristics will come to the minds of those skilled in the art, now having the benefit of the teachings of the present invention.

As illustrated with reference again to FIGS. 3-5, and now to FIGS. 6 and 6A-6C, a magnetic focusing material forming a shoe 86 is positioned around the permanent magnets 12, 26, 28 for affecting the magnetic field created by each of the fixed and rotatable permanent magnets. The magnets 12, 26, 28 are carried in the shoe 86 including steel plates 88. It has been found that the use of the steel plates 88 positioned around sides of the magnets provides a desirable focusing of the magnetic field and an improved field effect between the fixed and rotating magnets during operation. As illustrated, one embodiment has been shown to be effective in enhancing magnetic fields interacting by having top most side portions 12A, 26A, 28A of the magnets 12, 26 and 28 exposed, while front and rear portions 12B, 26B, 28B enclosed by the plates 88. Yet further, lower portions 88A of the plates 88 used to cover the front and rear portions of the magnets is contoured downwardly toward a base portion 89 of the shoe 86. The use of rotating magnets as herein described has resulted in a prolonged magnetic strength for all the magnets employed.

Figure 7:
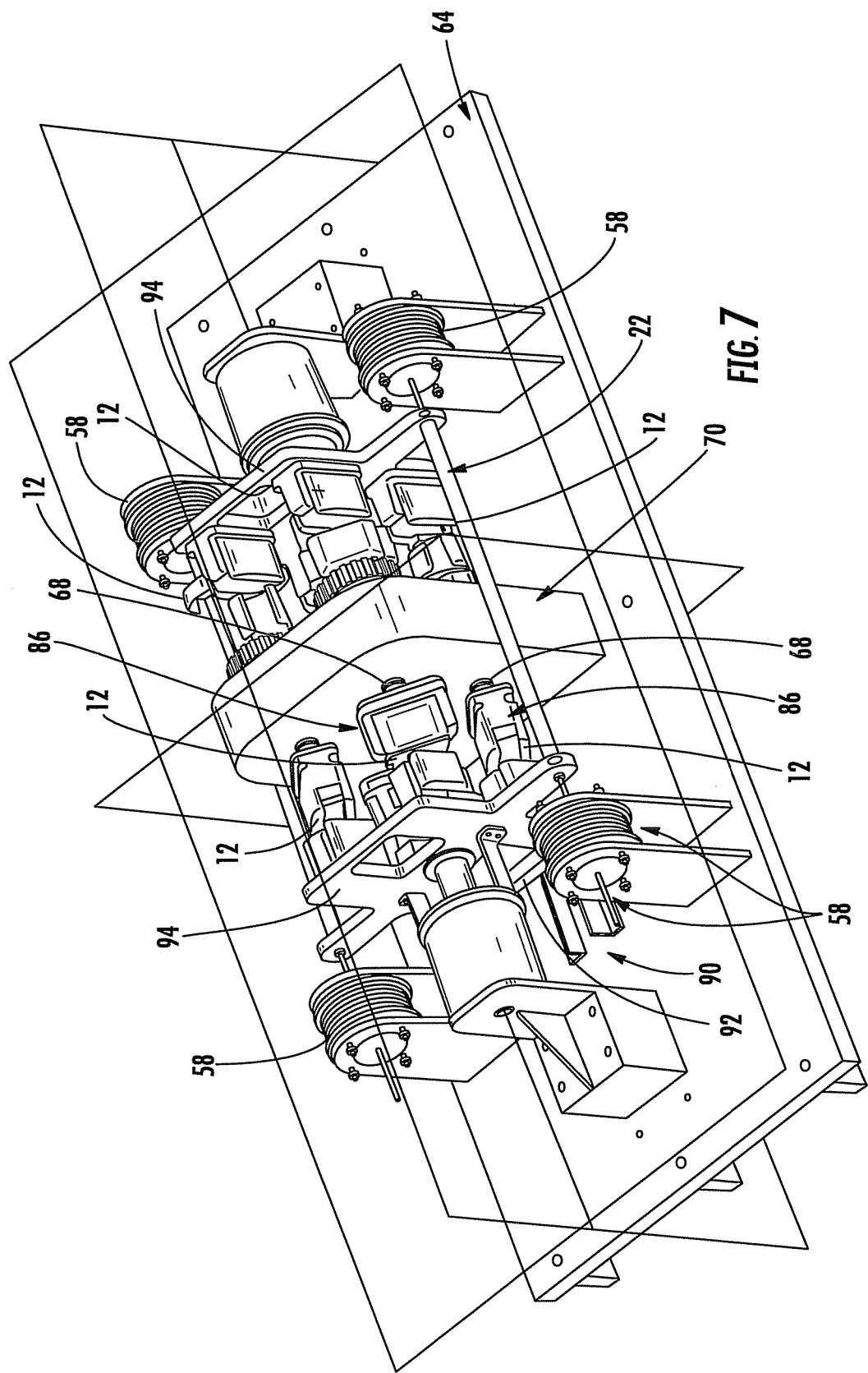

As illustrated by way of further example with reference to FIGS. 7-9, alternate embodiments may be structured while keeping within the teachings of the present invention, and as illustrated generally using like numerals to represent like element as earlier described.

With continued reference to FIGS. 7-9, the guide 54 earlier described with reference to FIG. 1, may include a guide rail 90 slidably receiving the shuttle 22 for maintaining an alignment of the linear movement parallel to the axis 20. As herein describe by way of example, the guide rail 90 is mounted to the base 64 and a follower arm 92 is mounted to a backing plate 94 of the shuttle 22 for providing a stable linear movement to the shuttle with the follower arm tracking within the guide rail. As a result, the magnets remain desirably aligned.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus comprising:
   a rotatable permanent magnet having a north pole and an opposing south pole aligned within a plane, the rotatable permanent magnet rotatable about an axis within the plane and between the opposing poles;
   a shuttle confined to a linear reciprocating movement generally parallel to the axis;
   first and second fixed permanent magnets affixed to the shuttle, wherein the rotatable permanent magnet is carried therebetween, wherein each of the first and second fixed permanent magnets has a north pole and an opposing south pole therein with the axis extending therebetween, and wherein the permanent magnets are positioned such that rotation of the rotatable permanent magnet is coincident with a repelling and an attracting of the first and second fixed permanent magnets, alternately, and thus the linear reciprocating movement of the shuttle.

2. The apparatus according to claim 1, further comprising a motor drive operable with the rotatable permanent magnet for providing a rotation thereto about the axis thereof.

3. The apparatus according to claim 1, further comprising first and second shock absorbers affixed on opposing sides of the shuttle and each operable for receiving an impact of the shuttle during the reciprocating movement thereof, wherein each of the first and second shock absorbers operates with the shuttle for overcoming an inertia provided thereby and for delivering a recoiling force thereto.

4. The apparatus according to claim 1, further comprising a linear generator operable with the shuttle for generating electrical power resulting from the linear movement of the shuttle.

5. The apparatus according to claim 1, wherein opposing faces of the rotatable and fixed permanent magnets are in a spaced relation during reciprocating movement of the shuttle, and wherein a gap formed thereby has a dimension ranging from 0.045 inches at a first extreme position of the shuttle to 1.17 inches at a second opposing extreme position during the reciprocating movement.

6. The apparatus according to claim 1, further comprising a guide slidably receiving the shuttle for maintaining an alignment of the linear movement parallel to the axis of the drive shaft.

7. The apparatus according to claim 1, wherein the poles of the first fixed permanent magnet are 180 degrees out of phase with the poles of the second permanent magnet.

8. An apparatus comprising:
   a motor drive operable for rotating a first shaft about a first axis thereof;
   a plurality of second shafts, each rotatable about a second axis;
   a coupling operable between the first shaft and the plurality of second shafts for rotation thereof each about their respective second axis;

a plurality of rotatable permanent magnets operable with the plurality of second shafts, wherein each of the plurality of rotatable permanent magnets is defined by a north pole and an opposing south pole within a plane, and wherein each of the plurality of rotatable permanent magnets is rotated by the second shaft about the second axis extending between the north and south poles;

a shuttle slidably carried for linear movement generally parallel to the first axis; and a plurality of fixed permanent magnets affixed to the shuttle, wherein opposing fixed permanent magnets are positioned on the shuttle for interacting with respective opposing rotatable permanent magnets carried by each of the second shafts, wherein each of the fixed permanent magnets is defined by a north pole and an opposing south pole within a plane, wherein the rotatable permanent magnets and the fixed permanent magnets are aligned along the second axes; and wherein rotation of each of the rotatable permanent magnets about their respective second axis results in a repelling and an attracting of the fixed permanent magnets affixed to the shuttle, thus providing a linear reciprocating movement to the shuttle.

9. The apparatus according to claim 8, further a shock absorber operable for receiving an impact from the shuttle during a reciprocating movement thereof, wherein the shock absorber overcomes an impact provided by the shuttle and delivers a recoiling force thereto.

10. The apparatus according to claim 9, wherein the shock absorber comprises first and second shock absorbers, and wherein the first shock absorber is positioned for receiving an impact resulting from movement of the shuttle in one direction and the second shock absorber is positioned for receiving an impact resulting from the movement of the shuttle in a second opposite direction.

11. The apparatus according to claim 8, further comprising a linear generator operable with the shuttle for generating electrical power resulting from the linear movement of the shuttle.

12. The apparatus according to claim 8, wherein opposing faces of the rotatable and fixed permanent magnets are in a spaced relation during reciprocating movement of the shuffle, and wherein a gap formed thereby has a dimension ranging from 0.045 inches at a first extreme position of the shuffle to 1.17 inches at a second opposing extreme position during the reciprocating movement.

13. The apparatus according to claim 8, wherein the plurality of second shafts comprises four auxiliary shafts, and thus the plurality of permanent magnets comprises eight rotatable permanent magnets and eight fixed permanent magnets.

14. The apparatus according to claim 8, further comprising a guide slidably receiving the shuttle for maintaining an alignment of the linear movement parallel to the axis of the drive shaft.

15. The apparatus according to claim 8, wherein the fixed permanent magnets on opposing ends of the second shaft are 180 degrees out of alignment with each other with respect to their polarity.

16. The apparatus according to claim 8, further comprising a magnetic focusing material positioned for affecting a magnetic field created by at least one of the permanent magnets.

17. The apparatus according to claim 16, wherein the magnetic focusing material comprises a steel sheath extending at least around a portion of the permanent magnet.

18. An apparatus for converting a rotary motion to a reciprocating linear motion, the apparatus comprising:

a base;

a motor affixed to the base, the motor operable for rotating a drive shaft operable therewith about an axis thereof;

a bracket affixed to the base, the bracket having opposing first and second sides;

a plurality of auxiliary shafts rotatably carried by the bracket, each of the plurality of auxiliary shafts having ends thereof extending through the first and second sides of the bracket;

a gear assembly operable between the drive shaft and the plurality of auxiliary shafts for rotation thereof by the drive shaft;

a plurality of rotatable permanent magnets attached to the plurality of auxiliary shafts, each of the plurality of rotatable permanent magnets carried at each of the ends of the plurality of auxiliary shafts for rotation thereby;

a shuttle slidably carried by the base for linear movement generally parallel to the axis of the drive shaft;

a plurality of fixed permanent magnets affixed to the shuttle, wherein one fixed permanent magnet is positioned on the shuttle for interacting with the rotatable permanent magnet carried at the end of the auxiliary shaft, and wherein rotation of the rotatable permanent magnets by the motor results in a repelling and an attracting of the fixed permanents affixed to the shuttle, thus providing a linear reciprocating movement to the shuttle; and first and second shock absorbers affixed to the base on opposing sides of the bracket, each of the first and second shock absorbers operable for receiving an impact of the shuttle during a reciprocating movement thereof and limiting movement thereof.

19. The apparatus according to claim 18, wherein each of the plurality of rotatable permanent magnets is rotated by the auxiliary shaft about a rotation axis extending between the opposing north and south poles, and wherein the plurality of rotatable permanent magnets on each side of the bracket have their respective poles opposing each other north to north and south to south.

20. The apparatus according to claim 18, further comprising a linear generator responsive to the linear movement of the shuttle for generating electrical power.

21. The apparatus according to claim 18, wherein opposing faces of the rotatable and fixed permanent magnets are in a spaced relation during reciprocating movement of the shuttle, and wherein a gap formed thereby has a dimension ranging from 0.045 inches at a first extreme position of the shuttle to 1.17 inches at a second opposing extreme position during the reciprocating movement.

22. The apparatus according to claim 18, further comprising a guide slidably receiving the shuttle for maintaining an alignment of the linear movement parallel to the axis of the drive shaft.

23. The apparatus according to claim 18, wherein the fixed permanent magnets on opposing ends of the auxiliary shaft are 180 degrees out of alignment with each other with respect to their polarity.

24. The apparatus according to claim 18, further comprising a magnetic focusing material positioned for affecting a magnetic field created by each of the fixed and rotatable permanent magnets.

25. The apparatus according to claim 24, wherein the magnetic focusing material comprises a shoe enclosing at least a portion of the fixed and rotatable permanent magnets, and wherein front and rear sides of the magnets are enclosed within the shoe while upper opposing side portions of the magnets are exposed.

26. The apparatus according to claim 24, wherein the shoe comprises steel plates covering the front and rear sides of the magnets, and wherein lower portions of the steel plates are contoured, thus having less steel plate material at ends of the magnets than the steel material proximate the ends.

* * * * *